(12) United States Patent
Tarrant

(10) Patent No.: US 8,092,610 B1
(45) Date of Patent: Jan. 10, 2012

(54) APPARATUS AND METHOD FOR CLEANING A DRIVER USED IN DISK DRIVE MANUFACTURING

(75) Inventor: Dean Albert Tarrant, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/974,181

(22) Filed: Dec. 21, 2010

(51) Int. Cl.
*B08B 1/00* (2006.01)

(52) U.S. Cl. ............... 134/6; 134/18; 134/25.1; 134/42; 451/48; 451/278; 451/349; 15/21.1; 15/88; 15/88.2; 15/97.1; 15/104.4

(58) Field of Classification Search .................... 451/48, 451/278, 349; 15/21.1, 88, 88.2, 97.1, 104.4; 134/6, 18, 25.1, 42
See application file for complete search history.

(56) References Cited

U.S. PATENT DOCUMENTS

| | | | | |
|---|---|---|---|---|
| 6,000,085 A | * | 12/1999 | Weng | 15/102 |
| 6,905,251 B2 | * | 6/2005 | Fujiwara et al. | 385/53 |

* cited by examiner

*Primary Examiner* — Bibi Carrillo

(57) ABSTRACT

Disclosed is a cleaning device for cleaning a driver used in a disk drive manufacturing process. The cleaning device includes: a body; a replaceable cleaning pad mounted in the body; and a cover mounted to the body over the cleaning pad, in which, the cover includes an opening to receive the driver and to expose a portion of the cleaning pad to receive and clean the driver. The cleaning device further includes a cleaning pad rotation mechanism mounted in the body that connects to the cleaning pad and rotates the cleaning pad. The cleaning pad rotation mechanism is configured to rotate the cleaning pad such that an unused portion of the cleaning pad is exposed to the opening for receipt of the driver and the cleaning pad rotation mechanism may be activated to rotate the cleaning pad.

9 Claims, 5 Drawing Sheets

APPARATUS AND METHOD FOR CLEANING A DRIVER USED IN DISK DRIVE MANUFACTURING

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, laptop computers, mobile computing devices (e.g., personal digital assistants (PDAs), cell-phones, etc.), as well as any other type of computer system. A computing device typically includes a processor and a memory as well as other types of electronic devices, such as, a disk drive.

A disk drive is composed of many different components that are assembled during a manufacturing process. For example, disk drives typically employ a moveable head actuator to frequently access large amounts of data stored on a disk. A conventional disk drive has a head disk assembly ("HDA") including at least one magnetic disk ("disk"), a disk clamp to mount the disk to a spindle motor that rapidly rotates the disk, and a head stack assembly ("HSA") that includes a moveable actuator arm and a head gimbal assembly ("HGA") with a moveable transducer head for reading and writing data. The HSA forms part of a servo control system that positions the moveable head over a particular track on the disk to read or write information from and to that track, respectively.

An important part of the disk drive manufacturing process is to ensure that when disk drives components are assembled together that the amount of debris and contamination particles is kept to a minimum. Contamination particles and debris may come from misplaced components, scraping, and from the manufacturing devices themselves, such as, the drivers that connect screws to components of the disk drive to assemble the disk drive. Unfortunately, contamination particles and debris may create defects in the disk media or in the other components of the disk drive. Contamination particles and debris during disk drive manufacturing may significantly downgrade the performance of the disk drive or may result in disk drive failure. This is particularly true for small-form-factor disk drives that require very high accuracy assembly techniques and very low contamination.

Further, a significant cost driver in disk drive testing is that there may be pre-existing media defects on one or more of the disks of a disk drive or damage to components of the disk drive. These defects are typically not discovered until self-testing of the disk drive, which occurs as part of a configuration and validation process during disk drive testing. During this testing, if a pre-existing media defect is discovered, this may result in a failure of the disk drive and consequently disk drive yield loss. This adds significant costs to the disk drive manufacturing process.

Accordingly, improved techniques to reduce the creation of contamination particles and debris during the assembly of the components of the disk drive in the disk drive manufacturing process are sought after.

DETAILED DESCRIPTION

Figure 1:
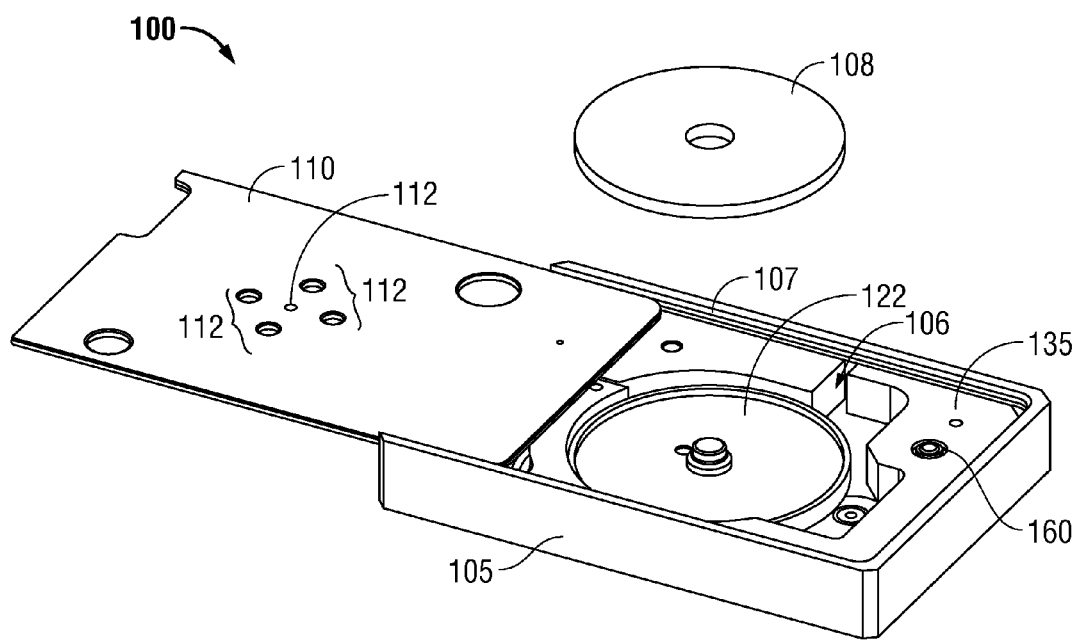
FIG. 1 is a perspective view of a cleaning device that may be used in the manufacturing process of a disk drive, according to one embodiment of the invention.

FIG. 1 is a perspective view of a cleaning device 100 that may be used in the manufacturing process of a disk drive, according to one embodiment of the invention. In particular, cleaning device 100 provides a cleaning material 108, such as polyurethane, to clean driver tool bits that are used in the manufacturing of a disk drive. As will be described in more detail hereinafter, cleaning device 100 may be inserted into the same nest of the disk drive manufacturing system as the disk drives that are being concurrently assembled to clean the drivers (e.g., screwdrivers and torx drivers) used in assembling the components of the disk drive. Also, cleaning device 100 may be automatically indexed to let a manufacturing operator know that a new cleaning pad 108 needs to be replaced within the cleaning device 110 to further clean the drivers in between disk drive assembly operations. As one particular example, cleaning device 100 may be used in the disk drive assembly process to clean automated screwdriver and torx driver tools that are used to drive clamp screws into such items as covers, disk clamps, voice coil motors (VCMs), head stack assemblies (HSAs), printed circuit boards (PCBs), as well as other disk drive components used in disk drive manufacturing and assembly.

Cleaning device 100 may include an approximately rectangular-shaped body 105 having a U-shaped recess 106 to receive components of the cleaning device including a replaceable cleaning pad 108 that may be mounted in the body and an approximately rectangular-shaped cover 110 that is mountable into a pair of aligned top grooves 107 of the body 105 over the cleaning pad 108. Thus, cover 110 may be slideably received and mounted to the body 105 over the replaceable cleaning pad 108. In this way, when it is time for the replaceable cleaning pad 108 to be replaced, the slideable cover 110 may be slid out of the body 105 and the cleaning pad 108 replaced. The cover 110 may then be slid back and re-mounted to the body 105 in the grooves 107. Also, cover 110 includes a plurality of openings 112 to receive the manufacturing drivers and to expose a portion of the cleaning pad 108 to receive and clean the driver, as will be described in more detail hereinafter.

Figure 2A:
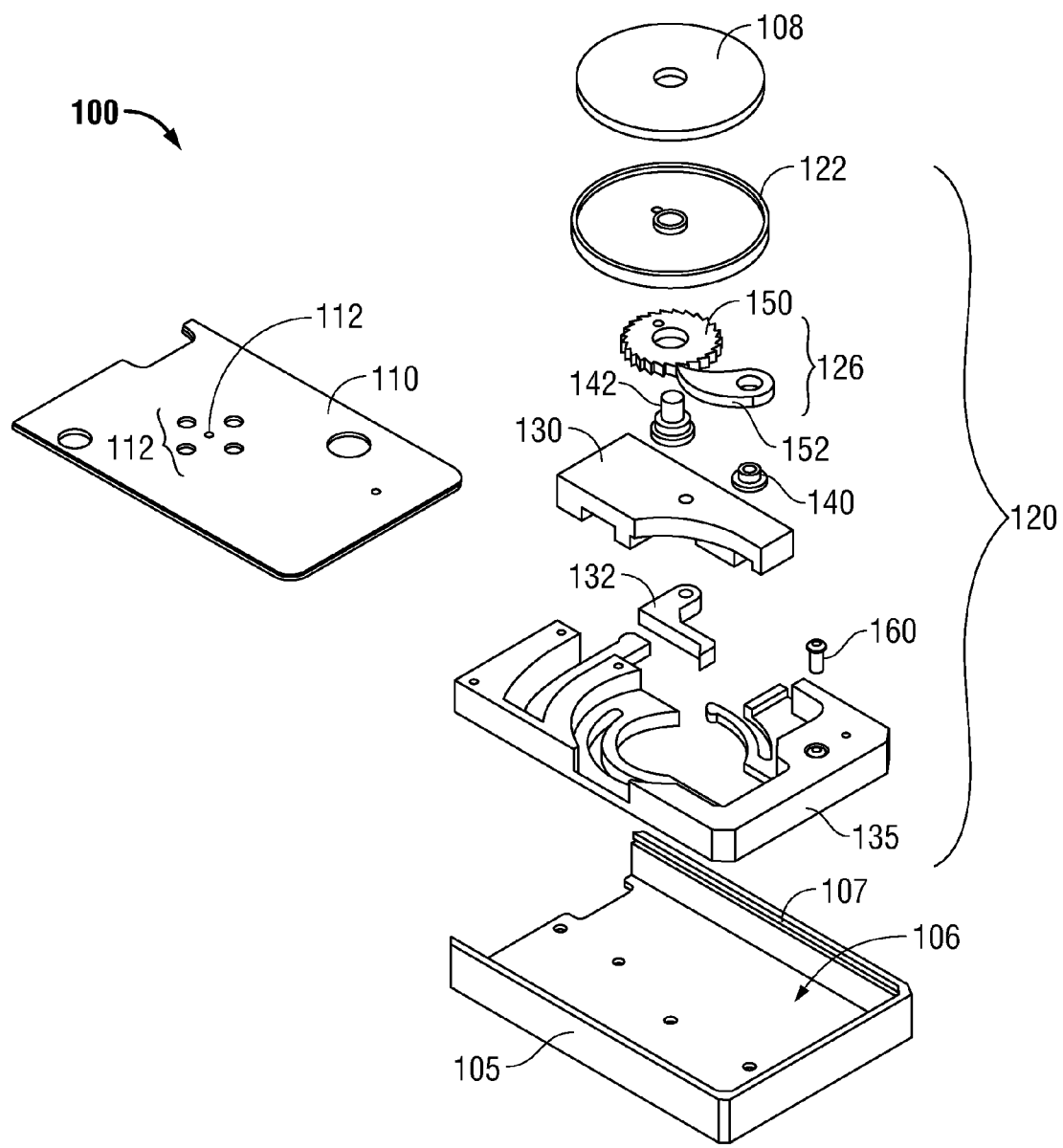
FIG. 2A is an exploded view of the cleaning device, according to one embodiment of the invention.

With reference also to FIG. 2A, which is an exploded view of the cleaning device 100, cleaning device 100 further includes a cleaning pad rotation mechanism 120 mounted in the body 105 that is connectable to the cleaning pad 108 to rotate the cleaning pad 108. In particular, the cleaning pad rotation mechanism 120 is configured to rotate the cleaning pad 108 such that an unused portion of the cleaning pad 108 is exposed to the openings 112 of the cover 110 for receipt of the drivers to effectively clean the drivers. Dependent upon the disk drive manufacturing process, either one driver or multiple drivers may be received for cleaning through the openings 112 of the cover 110 by contacting the cleaning pad 108. Further, as will be described in more detail hereinafter, the cleaning pad rotation mechanism 120 is periodically activated to rotate the cleaning pad 108 such that the cleaning pad is rotated for further cleaning of drivers.

In one embodiment, the replaceable cleaning pad 108 is a polyurethane material, such as DYCEM. However, many other types of cleaning materials may be utilized. As previously described, the drivers that are cleaned may be used in assembling the components of a disk drive during disk drive manufacturing. These types of drivers may include a screwdriver, a torx driver, etc., or any suitable type of driver that may be used in the manufacturing process of a disk drive. Moreover, it should be appreciated that any type of cleaning pad rotation mechanism to rotate a cleaning pad may be used.

Figure 2B:
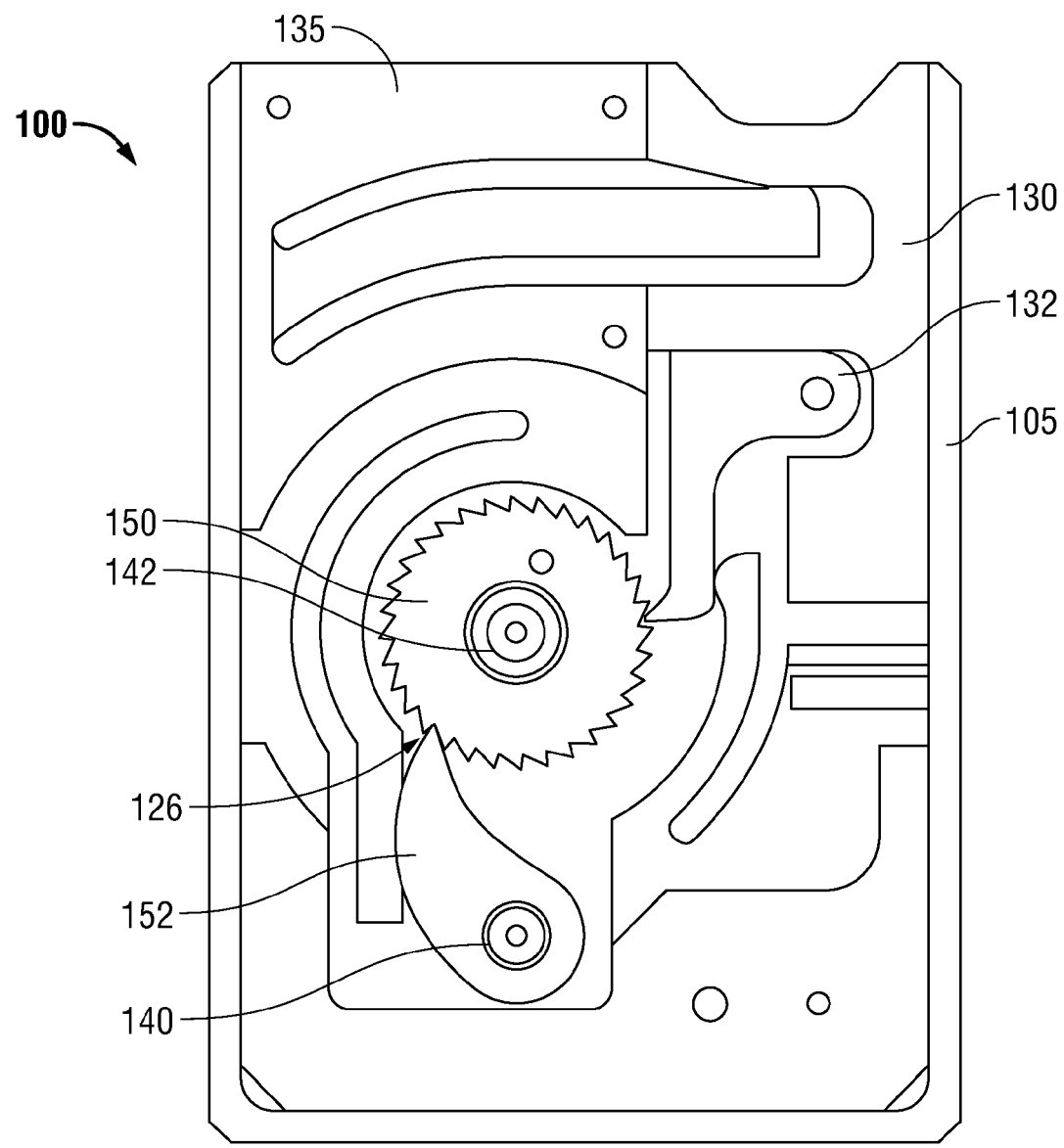
FIG. 2B is a top view of the cleaning device with the cover removed, according to one embodiment of the invention.

However, one embodiment of a cleaning pad rotation mechanism that may be used will be hereinafter described. With reference also to FIG. 2B, which is a top view of the cleaning device 100 with the cover removed, the cleaning pad rotation mechanism 120 may include a rotatable cleaning pad holder 122, a pawl latch 126, a push button 130, an approximately L-shaped push latch 132, and a spring frame 135. In this embodiment, the cleaning pad holder 122 is a circular-shaped holder with a sufficient recess to receive and hold a circular-shaped replaceable cleaning pad 108. The pawl latch 126 includes a gear 150 and latch 152. The gear 150 and pad holder 122 are connected to the base of the cover 105 by a screw 142 and latch 152 is connected to the base of the cover 105 by a screw 142.

With the above configuration, when the push button 130 is pushed, the push button 130 abuts the push latch 132 which then pushes against the pawl latch 126 such that the gear 150 and the cleaning pad holder 122 rotate. After the rotation, spring frame 130 pushes the push button 130 and the push latch 132 back to their initial position. However, the gear 150, cleaning pad holder 122, and cleaning pad 108 do no to rotate back as they are locked by latch 152. The spring frame 135 may be a plastic material suitable for pushing the push button 130 and push latch 132 forward and compressing and then automatically decompressing back and moving these items back to their initial position. On the other hand, the push button 130 and push latch 132 may be a metallic material. Also, a spring loaded ball plunger 160 may be connected to the spring frame 135 to abut against the cover 110 to hold it in place when it is slid in.

Figure 3:
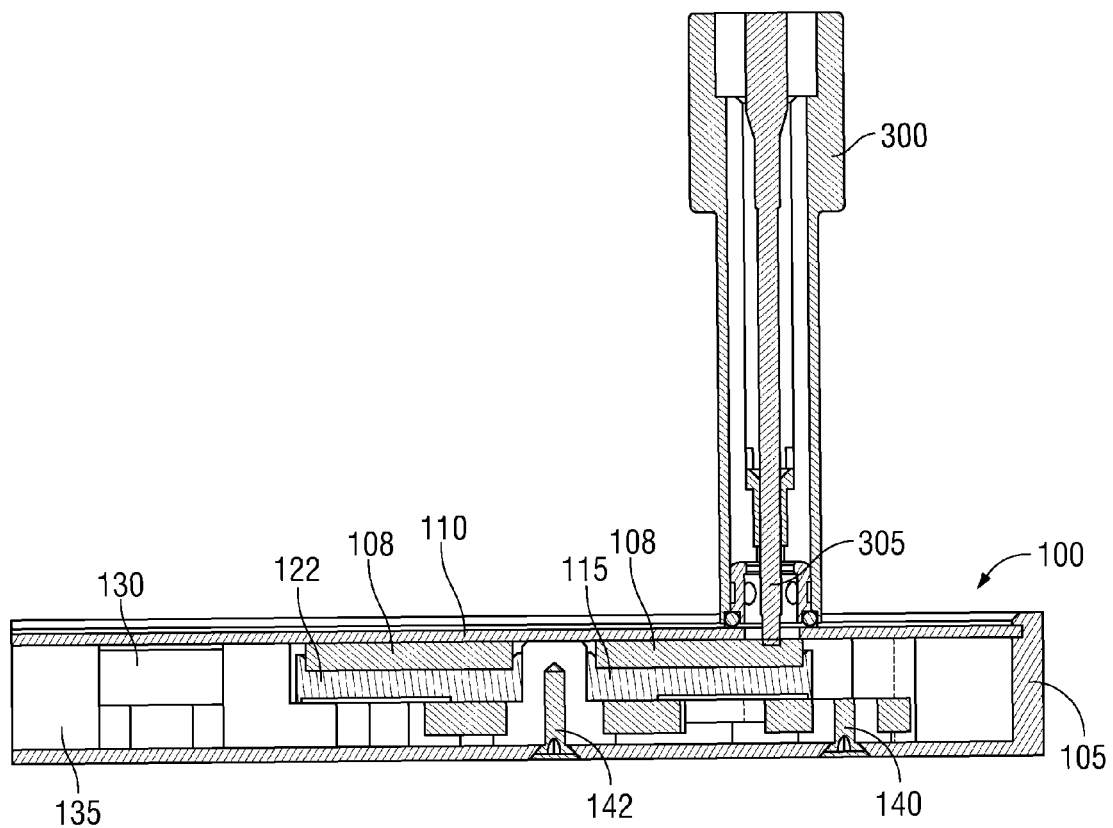
FIG. 3 is a cross-sectional view of the cleaning device and a screw finder, according to one embodiment of the invention.

With brief reference to FIG. 3, FIG. 3 is a cross-sectional view of the cleaning device 100 and a screw finder 300. In particular, FIG. 3 illustrates a screw finder 300 that includes a torx driver 305 is positioned through one of the holes of the cover 110 of cleaning device 100 and is extended through the hole into the cleaning pad 108 to clean the torx driver 305. For example, the torx driver 305 may be a star-like screwdriver that is utilized to rotate screws to connect components of a disk drive such as a disk drive cover, a disk clamp, a VCM, a HDA, a PCB, etc. It should be appreciated that the screw finder 300 may include multiple torx drivers that go through the multiple holes of the cover 100 be cleaned by the cleaning pad dependent upon the type of assembly process that the torx drivers are being cleaned for. This provides a beneficial function of keeping the drivers clean such that the components of the disk drive are assembled in a very clean fashion with a reduced amount of debris and contamination particles.

Figure 4:
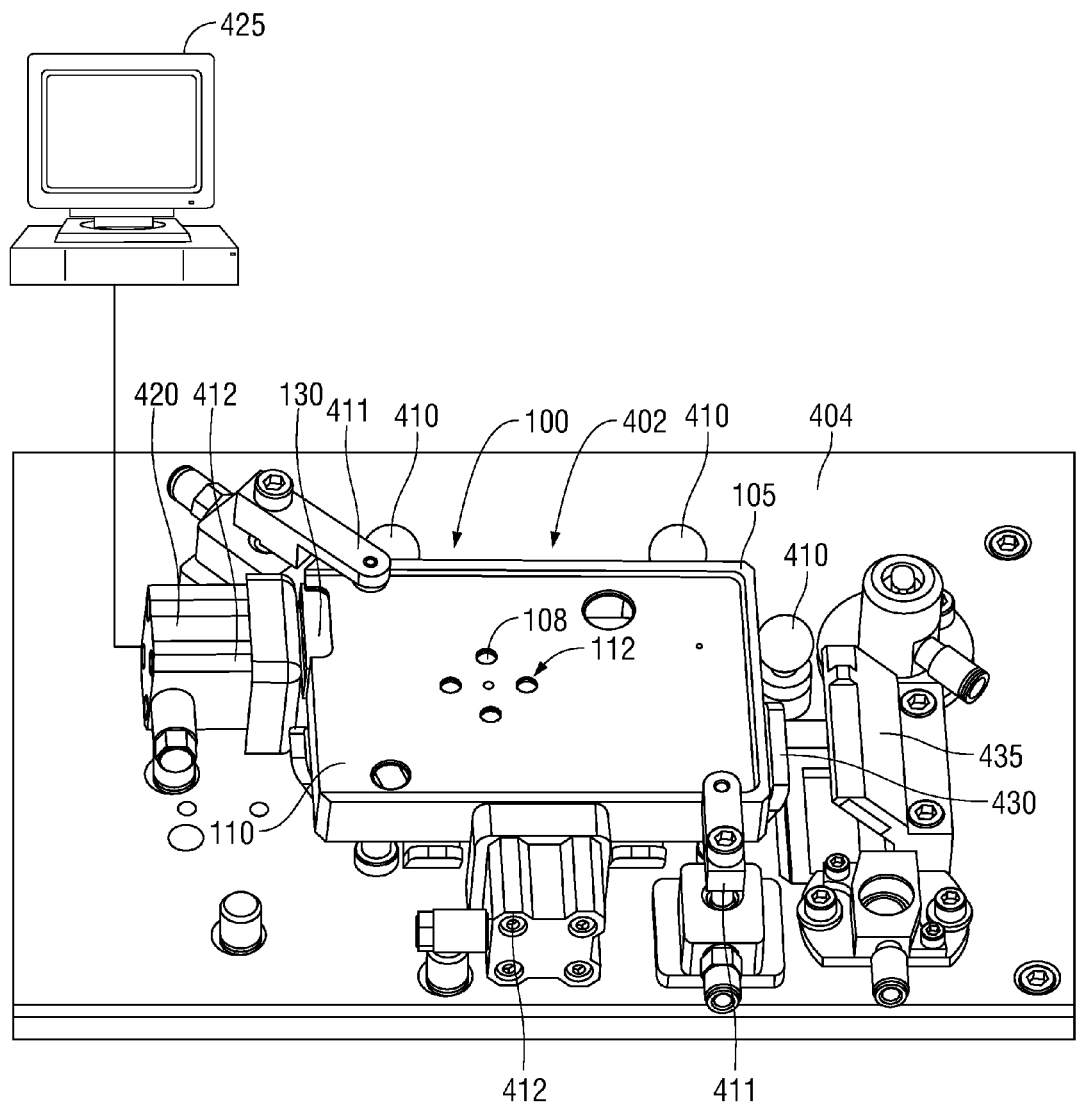
FIG. 4 is a perspective view of the cleaning device mounted into the nest of a disk drive manufacturing assembly apparatus.

With reference now to FIG. 4, FIG. 4 is a perspective view of the cleaning device 100 mounted into the nest 402 of a disk drive manufacturing assembly apparatus 404. In particular, cleaning device 100 may be put into the exact same nest 402 as the disk drives being assembled in between disk drive assembly steps to clean the drivers. Similar to a disk drive base structure of a disk drive being assembled, the cleaning device 100 is contained by fixtures 410, rotatable clamps 411, and by air cylinder clamps 412. When the cleaning device 100 is place in the nest 402, just like a disk drive, the air cylinder clamps 412 clamp the cleaning device 100 into place.

Additionally, in one embodiment, one of the air cylinder clamps 412 adjacent to the push button 130 of the cleaning device 100 includes a counter 420. Once the cleaning device 100 is placed into the nest 402 by an operator, the clamp 412 clamps against the cleaning device 100 pushing the push button 130 of the cleaning device 100. The pushing of the push button 130 of the cleaning device 100 activates the cleaning pad rotation mechanism by rotating the rotating the cleaning pad holder and the cleaning pad 108 to enable the cleaning of drivers of the disk drive assembly equipment by extending them through the holes 112 and into a new clean portion of the cleaning pad 108, as previously described.

The counter 420 may count how many times the cleaning pad 108 has been rotated by the cleaning pad rotation mechanism of the cleaning device 100. The counter 420 may also be coupled to a computer 425 having a display device. The counter 420 may include a maximum rotation value defining a maximum number of rotations that the rotating cleaning pad 108 can be rotated by the cleaning device 100 to clean the drivers until the cleaning pad 108 should be replaced. Thus, the counter 420 may implement counting functions to count how many times the cleaning pad has been rotated and when the maximum value has been reached. The counter 420 may includes controllers, processors, programs, circuitry, etc. to perform this functionality.

An indicator, such as computer 425 having a display device, may be coupled to the counter 420. Once the counter 420 has counted the maximum rotation value, the computer 425 on a display device may then indicate to an operator involved in the disk drive manufacturing process that the cleaning pad 108 of the cleaning device 100 needs to be replaced. It should be appreciated that a computer 425 having a display device for use as an indicator is just one example of an indicator. Many different types of indicators may be utilized to indicate to an operator that it is time to change the cleaning pad such as a sound device, a light source, a display device, or any other type of indicator device to provide an indication to an operator that it is time to change the cleaning pad.

Additionally, the body 105 of the cleaning device 100 may include an attached code 430, such as a bar code, that may be read by a reading device 435. The bar code may be transmitted to the counter 420. The counter 420 may define the maximum rotation value based upon the read bar code and can further count the number of rotations of the cleaning pad 108 already performed on the cleaning device 100 associated with the bar code to determine when the cleaning pad 108 of the cleaning device 100 needs to be replaced. Thus, whenever the cleaning device 100 is inserted, the bar code is read, which helps the counter 420 keep track of how many times the cleaning pad has been rotated as compared to the maximum rotation value associated with the cleaning device.

Therefore, an operator only has to place the cleaning device 100 into the same nest 402 as the disk drives currently being assembled in order to have the driver tools cleaned. The reading device 435 automatically reads the code 430 from cleaning device 100 which describes the maximum number of cleaning operations performable by the cleaning device 100 before the cleaning pad 108 needs to be replaced. Further, the code describes the types of cleaning operations that can be performed by the cleaning device 100 for the particular type of disk drives being concurrently assembled in conjunction with the cleaning by the cleaning device.

In this way, the operators are prompted by the system to place the cleaning device 100 into the nest 402 between each disk drive assembly process. As an example, a disk drive is placed into the nest 402 and drivers attach components for disk drive assembly, the operator replaces the disk drive being assembled with the cleaning device 100 into the nest 402 and the drivers are cleaned, the operator next places a disk drive into the nest 402 and drivers attach components for disk drive assembly, and then again the operator replaces the disk drive being assembled with the cleaning device 100 into the nest 402 and the drivers are cleaned, and this process is repeated. This provides a very efficient way to ensure that the drivers are kept clean in a disk drive assembly process and significantly reduces debris and contamination particles.

Further, the cleaning device 100 may be cleaned offline by simply removing the cover 110 (i.e., sliding it back) peeling out the cleaning pad 108 from the cleaning pad holder and installing a new cleaning pad. It should be appreciated that cleaning devices may be made specific for a particular type of disk drive product line. In particular, the cover 110 may have a hole or holes 112 that match the driver patterns for a particular type of disk drive assembly.

Accordingly, the cleaning device 100 makes it easier for the operator by removing the question for the operator of whether or not the driver has been cleaned for each operation. It also greatly increases the probability that the cleaning operation is repeated every time and for the same way for each disk drive. The cleaning device 100 greatly simplifies the cleaning process to ensure that a disk drive is assembled cleanly and with a minimal amount of contamination and debris. Further, as previously described, it can be implemented for differing types of disk drives to be assembled.

It should be appreciated that aspects of the invention may be implemented in the counter 420, computer 425, and/or or other circuitry, processors, controllers, computers, etc., of a disk drive manufacturing system, and may operate under the control of a program or routine to execute methods or processes in accordance with the previously described embodiments of the invention.

For purposes of the present specification, it should be appreciated that the terms "processor", "controller", etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Thus, components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

While embodiments of the invention and their various electrical, mechanical and functional components have been described in particular embodiments, it should be appreciated that the embodiments can be implemented with a wide variety of differing electrical, mechanical and functional components, and combinations thereof. Further, although the previous embodiments have been described as being employed for use in a disk drive manufacturing process, these embodiments may be implemented with numerous other types of manufacturing processes to manufacture a wide variety of different types of devices.

What is claimed is:

1. A method for cleaning a driver used in a disk drive manufacturing process, the method comprising:

providing a driver of a disk drive assembly;

mounting a replaceable cleaning pad to a cleaning pad rotation mechanism in a cleaning device;

mounting a cover to the cleaning device over the cleaning pad, wherein the cover includes an opening to receive the driver of the disk drive assembly and to expose an unused portion of the cleaning pad to receive and clean the driver;

rotating the cleaning pad by activating the cleaning pad rotation mechanism such that the unused portion of the cleaning pad is exposed to the opening for receipt of the driver;

inserting the driver into the opening of the cleaning device; and cleaning the driver of the disk drive assembly by contacting the driver with the unused portion of the cleaning pad.

2. The method of claim 1, wherein the replaceable cleaning pad is a polyurethane material.

3. The method of claim 1, wherein the driver is a screwdriver.

4. The method of claim 1, wherein the driver is a torx driver.

5. The method of claim 1, wherein the cleaning pad rotation mechanism includes a push button coupled to a pawl and a spring frame.

6. The method of claim 1, wherein a counter is used to activate the cleaning pad rotation mechanism by pushing a push button of the cleaning pad rotation mechanism to rotate the cleaning pad and to count how many times the cleaning pad has been rotated by the cleaning pad rotation mechanism.

7. The method of claim 6, wherein a maximum rotation value is associated with the counter.

8. The method of claim 7, wherein an indicator is coupled to the counter such that, when the counter has counted the maximum rotation value, the indicator indicates to an operator involved in the disk drive manufacturing process that the replaceable cleaning pad needs to be replaced.

9. The method of claim 7, wherein a body of the cleaning device includes a barcode to be read by the counter to provide the maximum rotation value.

* * * * *